US012746747B2

(12) United States Patent
Masujima et al.

(10) Patent No.: US 12,746,747 B2
(45) Date of Patent: Sep. 29, 2026

(54) LIQUID DISCHARGE APPARATUS

(71) Applicant: SEIKO EPSON CORPORATION, Tokyo (JP)

(72) Inventors: Daiki Masujima, Shiojiri (JP); Takashi Usuki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 192 days.

(21) Appl. No.: 18/621,212

(22) Filed: Mar. 29, 2024

(65) Prior Publication Data

US 2024/0326412 A1 Oct. 3, 2024

(30) Foreign Application Priority Data

Mar. 31, 2023 (JP) ................................ 2023-057595

(51) Int. Cl.
*B41J 2/045* (2006.01)
*B41J 2/17* (2006.01)

(52) U.S. Cl.
CPC ......... *B41J 2/04573* (2013.01); *B41J 2/0455* (2013.01); *B41J 2/04551* (2013.01); *B41J 2/04581* (2013.01); *B41J 2/1707* (2013.01)

(58) Field of Classification Search
CPC .................................................. B41J 2/04573
See application file for complete search history.

(56) References Cited

U.S. PATENT DOCUMENTS

| | | | | |
|---|---|---|---|---|
| 5,821,954 A * | 10/1998 | Imai | B41J 2/04541 347/14 |
| 2008/0150978 A1* | 6/2008 | Sato | B41J 29/38 347/9 |
| 2012/0249638 A1* | 10/2012 | Takano | B41J 2/0454 347/10 |
| 2015/0174898 A1* | 6/2015 | Komada | B41J 2/04596 347/14 |
| 2020/0086641 A1* | 3/2020 | Matsumoto | B41J 2/04591 |

FOREIGN PATENT DOCUMENTS

JP 2019-166713 A 10/2019

* cited by examiner

*Primary Examiner* — Shelby L Fidler
(74) *Attorney, Agent, or Firm* — Spencer Fane LLP

(57) ABSTRACT

A liquid discharge apparatus including: a first control circuit configured to output a reference drive signal and a first discharge control signal; a second control circuit configured to output a second discharge control signal; a drive circuit configured to output a drive signal from the reference drive signal; a first discharge section configured to discharge liquid in accordance with the drive signal and the first discharge control signal; a second discharge section configured to discharge liquid in accordance with the drive signal and the second discharge control signal; a first timing signal output circuit configured to output a first timing signal; and a second timing signal output circuit configured to output a second timing signal, wherein the first control circuit and the second control circuit are operated in accordance with the first timing signal or the second timing signal.

6 Claims, 8 Drawing Sheets

| | | LD | MD | SD | ND |
|---|---|---|---|---|---|
| [SIH,SIL] | | [1,1] | [1,0] | [0,1] | [0,0] |
| S | T1 | H | H | L | L |
| | T2 | H | L | H | L |
| | T3 | L | L | L | H |

LIQUID DISCHARGE APPARATUS

The present application is based on, and claims priority from JP Application Serial Number 2023-057595, filed Mar. 31, 2023, the disclosure of which is hereby incorporated by reference herein in its entirety.

BACKGROUND

1. Technical Field

The present disclosure relates to a liquid discharge apparatus.

2. Related Art

JP-A-2019-166713 discloses a liquid discharge apparatus that discharges ink onto a medium and that has a configuration in which plural print heads are controlled by corresponding plural circuit devices.

However, when plural print heads are controlled by corresponding plural circuit devices, the technique disclosed in JP-A-2019-166713 alone is insufficient, and accordingly, there is room for improvement.

SUMMARY

According to an aspect of the present disclosure, there is provided a liquid discharge apparatus including: a first control circuit configured to output a reference drive signal and a first discharge control signal; a second control circuit configured to output a second discharge control signal; a drive circuit configured to output a drive signal in accordance with the reference drive signal; a first discharge section configured to discharge liquid onto a medium in accordance with the drive signal and the first discharge control signal; a second discharge section configured to discharge liquid onto the medium in accordance with the drive signal and the second discharge control signal; a first timing signal output circuit configured to output a first timing signal in accordance with a relative positional relationship between the medium and the first discharge section; and a second timing signal output circuit configured to output a second timing signal, wherein in a first mode in which the relative positional relationship between the medium and the first discharge section changes, the first control circuit and the second control circuit are operated in accordance with the first timing signal, whereas in a second mode in which the relative positional relationship between the medium and the first discharge section does not change, the first control circuit and the second control circuit are operated in accordance with the second timing signal.

DESCRIPTION OF EMBODIMENTS

In the following, a description will be given of preferred embodiments of the present disclosure with reference to the drawings. The drawings provided are illustrated for convenience of explanation. In this regard, the embodiments described below do not unreasonably restrict the contents described in the scope of the claims. Note that not all the components of the configurations described below are necessarily mandatory constituent features.

1. Functional Configuration of Liquid Discharge Apparatus

A description will be given of the functional configuration of a liquid discharge apparatus 1 according to the present embodiment. The liquid discharge apparatus 1 according to the present embodiment is an ink jet printer that discharges ink as an example of a liquid onto a medium so as to form a desired image on the medium. The liquid discharge apparatus 1 receives image data from an external device such as a computer or the like, not illustrated in the figure, and forms an image on the medium based on the received image data.

Figure 1:
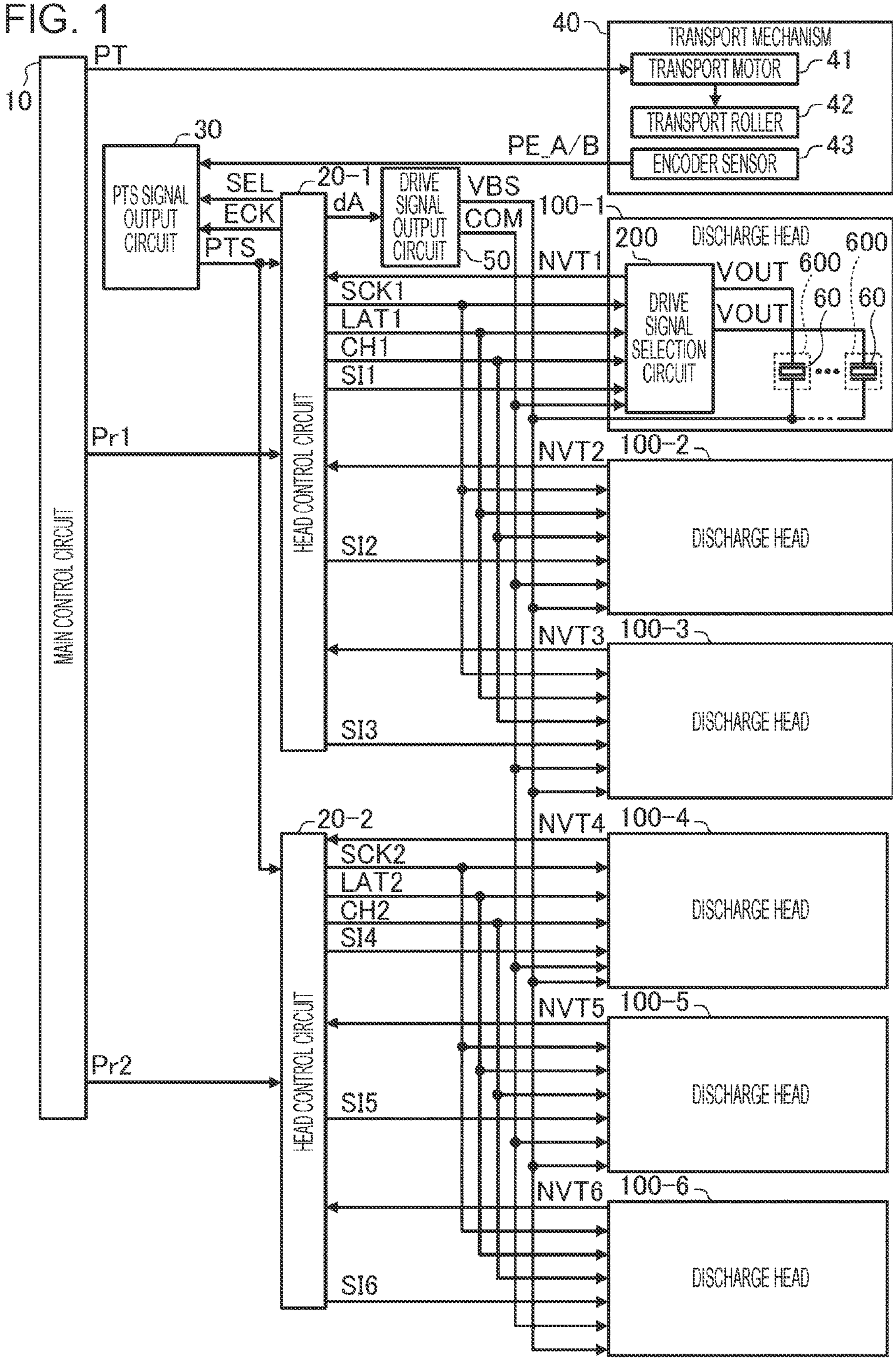
FIG. 1 is a diagram illustrating the functional configuration of a liquid discharge apparatus.

FIG. 1 is a diagram illustrating the functional configuration of the liquid discharge apparatus 1. As illustrated in FIG. 1, the liquid discharge apparatus 1 includes a main control circuit 10, head control circuits 20-1 and 20-2, a PTS signal output circuit 30, a transport mechanism 40, a drive signal output circuit 50, and discharge heads 100-1 to 100-6.

The main control circuit 10 is one or a plurality of semiconductor devices having a plurality of functions and constituted by, for example, a CPU (central processing unit) or a SoC (system on a chip). The main control circuit 10 receives the input of image data from an external device not illustrated in the figure and provided outside the liquid discharge apparatus 1. The main control circuit 10 performs predetermined image processing on the input image data. The main control circuit 10 then outputs a signal after the image processing to the head control circuit 20-1 as an image information signal Pr1 and outputs the signal after the image processing to the head control circuit 20-2 as an image information signal Pr2.

The main control circuit 10 is also able to control the operation of the head control circuits 20-1 and 20-2, regardless of image data. In this case, the main control circuit 10 generates the image information signals Pr1 and Pr2 including the information for controlling the operation of the head control circuits 20-1 and 20-2 and outputs the signals to the corresponding head control circuits 20-1 and 20-2. The operation performed by the main control circuit 10 on the head control circuits 20-1 and 20-2, regardless of the image signals, is, for example, a maintenance operation performed on the discharge heads 100-1 to 100-6. Specifically, the operation includes a detection operation that detects the discharge state of ink from the respective discharge heads 100-1 to 100-6 and a wiping operation, a flushing operation, and the like for restoring the state of the respective discharge heads 100-1 to 100-6.

Here, the image information signals Pr1 and Pr2 output by the main control circuit 10 may be electrical signals such as differential signals or the like, or optical signals. Also, the image processing performed by the main control circuit 10 includes, for example, color conversion processing that converts the input image signal to color information of red, green, and blue and then converts the color information to the color information corresponding to the respective ink colors to be discharged from the liquid discharge apparatus 1, and halftone processing that digitizes the color information after the color conversion processing, and the like. In this regard, the image processing performed by the main control circuit 10 is not limited to the above-described color conversion processing and halftone processing.

The main control circuit 10 also generates a transport control signal PT for controlling the transport of a medium onto which ink is discharged and outputs the signal to a transport mechanism 40. The transport mechanism 40 includes a transport motor 41, a transport roller 42, and an encoder sensor 43. The transport control signal PT output by the main control circuit 10 is input to the transport motor 41. The transport motor 41 performs driving in accordance with the transport control signal PT. The driving force produced by the transport motor 41 is supplied to the transport roller 42 that holds and sandwiches the medium. Thereby, the transport roller 42 is rotationally driven, and the medium held or sandwiched by the transport roller 42 is transported in the rotation direction of the transport roller 42. Here, the direction in which the medium is transported is sometimes referred to as a transport direction in the following description.

The encoder sensor 43 generates a signal in accordance with the rotation amount of the transport roller 42 and in accordance with the transport position of the medium transported in accordance with the rotary drive of the transport roller 42 and outputs the signal as an encoder signal PE_A/B. That is, the encoder sensor 43 outputs the encoder signal PE_A/B in accordance with the transport position of the medium, that is, the relative positional relationships of the medium and the discharge heads 100-1 to 100-6 described later. For the encoder sensor 43 described above, it is possible to use a two-phase-type rotary encoder, for example. That is, the encoder signal PE_A/B output by the encoder sensor 43 includes an A-phase signal and a B-phase signal whose phase is delayed by 90 degrees with respect to the A-phase signal.

By using the two-phase-type rotary encoder for the encoder sensor 43 that detects the transport position of the medium, it is possible to obtain the rotation direction of the transport roller 42, namely, the transport direction of the medium, in accordance with the encoder signal PE_A/B output by the encoder sensor 43. In the following description, when distinguishing the A-phase signal and the B-phase signal included in the encoder signal PE_A/B, the A-phase signal output by the encoder sensor 43 is referred to as an encoder signal PE_A, and the B-phase signal output by the encoder sensor 43 whose phase is delayed by 90 degrees with respect to the encoder signal PE_A is referred to as an encoder signal PE_B.

The encoder signal PE_A/B output by the encoder sensor 43 of the transport mechanism 40 is input to the PTS signal output circuit 30. Also, the PTS signal output circuit 30 receives the input of a select signal SEL and an encoder clock signal ECK, which are output by the head control circuit 20-1 described later. The PTS signal output circuit 30 generates an operation timing signal PTS that specifies the operation timings of the head control circuits 20-1 and 20-2 in accordance with the input encoder signal PE_A/B, the select signal SEL, and the encoder clock signal ECK and outputs the operation timing signal PTS to the head control circuits 20-1 and 20-2. In this regard, a detailed description will be given later of the PTS signal output circuit 30.

The head control circuit 20-1 is constituted by, for example, a SoC (system on a chip). The head control circuit 20-1 receives the image information signal Pr1 output by the main control circuit 10 and the operation timing signal PTS output by the PTS signal output circuit 30. The head control circuit 20-1 outputs a latch signal LAT1 synchronously with the operation timing signal PTS and outputs synchronously with the latch signal LAT1, in accordance with the image information signal Pr1, a change signal CH1, a system clock signal SCK1, print data signals SI1 to SI3, a reference drive signal dA, a select signal SEL, and the encoder clock signal ECK.

The head control circuit 20-2 is constituted by, for example, an SoC (system on a chip). The head control circuit 20-2 receives the input of the image information signal Pr2 output by the main control circuit 10 and the operation timing signal PTS output by the PTS signal output circuit 30. The head control circuit 20-2 outputs a latch signal LAT2 synchronously with the operation timing signal PTS and outputs synchronously with the latch signal LAT2, in accordance with the image information signal Pr2, a change signal CH2, a system clock signal SCK2, and print data signals SI4 to SI6.

The reference drive signal dA output by the head control circuit 20-1 is input to the drive signal output circuit 50. The drive signal output circuit 50 converts the input reference drive signal dA to an analog signal and then performs class D amplification on the converted analog signal so as to generate and output a drive signal COM. Also, the drive signal output circuit 50 generates a reference voltage signal VBS as a reference potential of the drive signal COM and functions as a reference potential for driving a piezoelectric element 60 described later.

The latch signal LAT1, the change signal CH1, the system clock signal SCK1, and the print data signal SI1, which are output by the head control circuit 20-1, and the drive signal COM and the reference voltage signal VBS, which are output by the drive signal output circuit 50, are input to a discharge head 100-1.

The discharge head 100-1 includes a drive signal selection circuit 200 and a plurality of discharge sections 600, with each discharge section 600 including a corresponding piezoelectric element 60. The latch signal LAT1, the change signal CH1, the system clock signal SCK1, the print data signal SI1, and the drive signal COM are input to the drive signal selection circuit 200. The drive signal selection circuit 200 determines the signal waveform included in the drive signal COM to be selected or deselected at a timing specified by the latch signal LAT1 and the change signal CH1 in accordance with the print data signal SI1 so as to generate drive signals VOUT corresponding to the respective discharge sections 600. The drive signal selection circuit 200 then supplies the generated drive signals VOUT to one end of the piezoelectric elements 60 included in the corresponding discharge sections 600. At this time, the reference voltage signal VBS is supplied to the other end of the plurality of piezoelectric elements 60 of the discharge head 100-1. The piezoelectric element 60 is driven in accordance with the potential difference between the drive signal VOUT supplied to one end thereof and the reference voltage signal VBS supplied to the other end thereof. The amount of ink in accordance with the drive of the piezoelectric element 60 is then discharged from the discharge section 600.

The drive signal selection circuit 200 obtains the residual vibration of the discharge section 600, which occurs after the piezoelectric element 60 is driven, and generates a residual vibration signal NVT1 in accordance with the obtained residual vibration. The drive signal selection circuit 200 then outputs the generated residual vibration signal NVT1 to the head control circuit 20-1. The frequency and the voltage amplitude of the residual vibration that occurs with the discharge section 600 is the state of the discharge section 600 and changes, for example, when a bubble is mixed in the discharge section 600 or when a change occurs in the viscosity of ink stored in the discharge section 600. The drive signal selection circuit 200 obtains the frequency and the voltage amplitude of the residual vibration and generates the residual vibration signal NVT1 in accordance with at least one of the obtained frequency and voltage amplitude, and outputs the residual vibration signal NVT1 to the head control circuit 20-1. Thereby, the head control circuit 20-1 is able to detect the state of the discharge section 600 included in the discharge head 100-1, which is the discharge state of ink discharged from the discharge head 100-1.

Here, the discharge heads 100-2 to 100-6 have the same configuration and perform the same operation.

The discharge head 100-2 includes a drive signal selection circuit 200 and a plurality of discharge sections 600, and a plurality of the discharge sections 600 include the respective piezoelectric elements 60. The discharge head 100-2 then receives the input of the latch signal LAT1, the change signal CH1, the system clock signal SCK1, and a print data signal SI2, which are output by the head control circuit 20-1, and the drive signal COM and the reference voltage signal VBS, which are output by the drive signal output circuit 50, and the discharge head 100-2 outputs a residual vibration signal NVT2.

In the same manner, the discharge head 100-3 includes a drive signal selection circuit 200 and a plurality of discharge sections 600, and a plurality of the discharge sections 600 include the respective piezoelectric elements 60. The discharge head 100-3 then receives the input of the latch signal LAT1, the change signal CH1, the system clock signal SCK1, and the print data signal SI3, which are output by the head control circuit 20-1, and the drive signal COM and the reference voltage signal VBS, which are output by the drive signal output circuit 50, and the discharge head 100-3 outputs a residual vibration signal NVT3.

In the same manner, the discharge head 100-4 includes a drive signal selection circuit 200 and a plurality of the discharge sections 600, a plurality of discharge section 600 include the respective piezoelectric elements 60. The discharge head 100-4 then receives the input of the latch signal LAT2, the change signal CH2, the system clock signal SCK2, and a print data signal SI4, which are output by the head control circuit 20-2, and the drive signal COM and the reference voltage signal VBS, which are output by the drive signal output circuit 50, and the discharge head 100-4 outputs a residual vibration signal NVT4.

In the same manner, the discharge head 100-5 includes a drive signal selection circuit 200 and a plurality of discharge sections 600, and a plurality of the discharge section 600 include the respective piezoelectric elements 60. The discharge head 100-5 then receives the input of the latch signal LAT2, the change signal CH2, the system clock signal SCK2, and a print data signal SI5, which are output by the head control circuit 20-2, and the drive signal COM and the reference voltage signal VBS, which are output by the drive signal output circuit 50, and the discharge head 100-5 outputs a residual vibration signal NVT5.

In the same manner, the discharge head 100-6 includes the drive signal selection circuit 200 and a plurality of discharge sections 600, and a plurality of the discharge sections 600 include the respective piezoelectric elements 60. The discharge head 100-6 then receives the input of the latch signal LAT2, the change signal CH2, the system clock signal SCK2, and a print data signal SI6, which are output by the head control circuit 20-2, and the drive signal COM and the reference voltage signal VBS, which are output by the drive signal output circuit 50, and the discharge head 100-6 outputs a residual vibration signal NVT6.

In the following description, when there is no need to distinguish the discharge heads 100-1 to 100-6, the discharge heads 100-1 to 100-6 are sometimes referred to simply as a discharge head 100. A description will be given on the assumption that the discharge head 100 receives the input of a latch signal LAT as the latch signals LAT1 and LAT2, a change signal CH as the change signals CH1 and CH2, a system clock signal SCK as the system clock signals SCK1 and SCK2, a print data signal SI as the print data signals SI1 to SI6, the drive signal COM, and the reference voltage signal VBS, and outputs a residual vibration signal NVT as the residual vibration signals NVT1 to NVT6.

Figure 2:
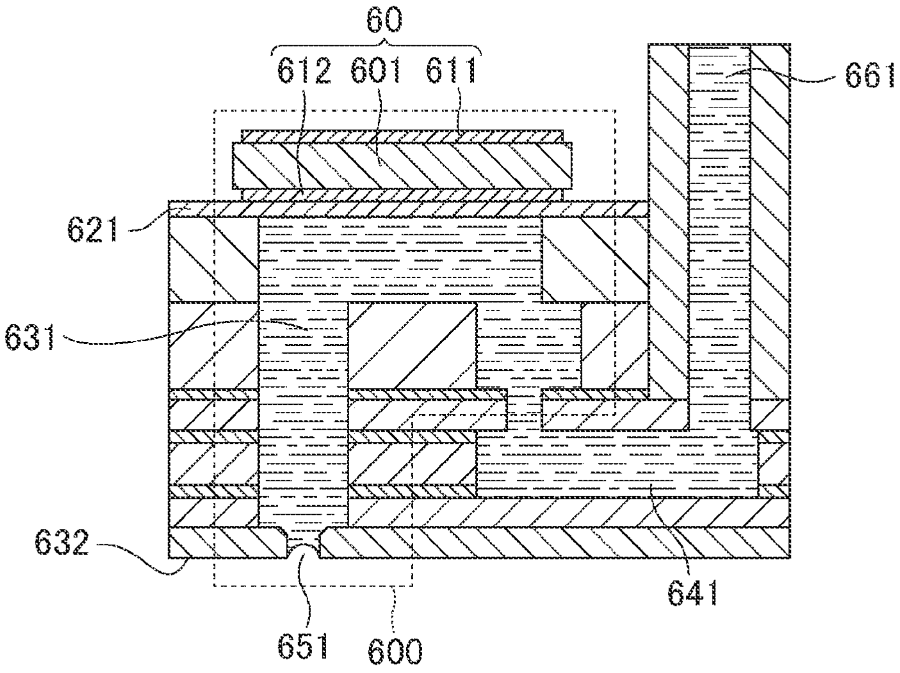
FIG. 2 is a diagram illustrating an example of the schematic structure of a discharge section.

Here, a description will be given of an example of the structure of the discharge section 600 included in the discharge head 100. FIG. 2 is a diagram illustrating an example of the schematic structure of one of the plurality of the discharge sections 600 included in the discharge head 100. In this regard, in addition to the discharge section 600, a reservoir 641 provided in common for the plurality of discharge sections 600 and a supply opening 661 that supplies ink to the reservoir 641 are illustrated in FIG. 2.

As illustrated in FIG. 2, the discharge section 600 includes a piezoelectric element 60, a vibration plate 621, a cavity 631, and a nozzle plate 632.

The piezoelectric element 60 includes a piezoelectric body 601 and electrodes 611 and 612. In the piezoelectric element 60, the electrodes 611 and 612 are positioned so as to sandwich the piezoelectric body 601. One of the electrodes 611 and 612 is supplied with the drive signal VOUT, and the other of the electrodes 611 and 612 is supplied with the reference voltage signal VBS. The piezoelectric element 60 configured as described above is driven such that the central part of the piezoelectric body 601 is displaced in the vertical direction in accordance with the potential difference of the drive signal VOUT supplied to one of the electrodes 611 and 612 and the reference voltage signal VBS supplied to the other of the electrodes 611 and 612.

The vibration plate 621 is positioned below the piezoelectric element 60 in FIG. 2. That is, the piezoelectric element 60 is formed on the upper surface of the vibration plate 621 in FIG. 2. The vibration plate 621 as described above is displaced in the vertical direction by the displacement in the vertical direction of the piezoelectric element 60 while being driven.

The cavity 631 is positioned below the vibration plate 621 in FIG. 2. The cavity 631 communicates with the reservoir 641. Thereby, the ink supplied via the supply opening 661 is supplied to the cavity 631 via the reservoir 641. The internal volume of the cavity 631 changes with the displacement of the vibration plate 621 in the vertical direction. That is, the vibration plate 621 functions as a diaphragm that changes the internal volume of the cavity 631, and the cavity 631 functions as a pressure chamber whose internal pressure changes with the displacement of the vibration plate 621.

A nozzle 651 is formed on the nozzle plate 632. The nozzle 651 is an opening on the nozzle plate 632 and communicates with the cavity 631. The ink filled in the cavity 631 is discharged from the nozzle 651 with a change in the internal volume of the cavity 631.

In the discharge section 600 configured as described above, when the piezoelectric element 60 is driven so as to be bent upward by the potential difference between the drive signal VOUT and the reference voltage signal VBS, the vibration plate 621 is displaced upward. Thereby, the internal volume of the cavity 631 is expanded, and the ink stored in the reservoir 641 is drawn into the cavity 631. On the other hand, when the piezoelectric element 60 is driven so as to be bent downward by the potential difference between the drive signal VOUT and the reference voltage signal VBS, the vibration plate 621 is displaced downward. Thereby, the internal volume of the cavity 631 is reduced to discharge, from the nozzle 651, an amount of ink corresponding to the degree of the reduction of the internal volume of the cavity 631. In this regard, the structure of the piezoelectric element 60 included in the discharge section 600 is only required to discharge ink from the nozzle 651 by being driven, and the structure is not limited to the structure illustrated in FIG. 2.

2. Functional Configuration of Drive Signal Selection Circuit

Next, a description will be given of the configuration and the operation of the drive signal selection circuit 200. The drive signal selection circuit 200 determines the signal waveform included in the drive signal COM to be selected or deselected in accordance with the system clock signal SCK, the print data signal SI, the latch signal LAT, and the change signal CH so as to generate drive signals VOUT corresponding to the respective discharge sections 600. The drive signal selection circuit 200 then outputs the generated drive signals VOUT to the corresponding discharge sections 600. In describing the configuration and the operation of the drive signal selection circuit 200, first, a description will be given of an example of the signal waveform of the drive signal COM input to the drive signal selection circuit 200.

Figure 3:
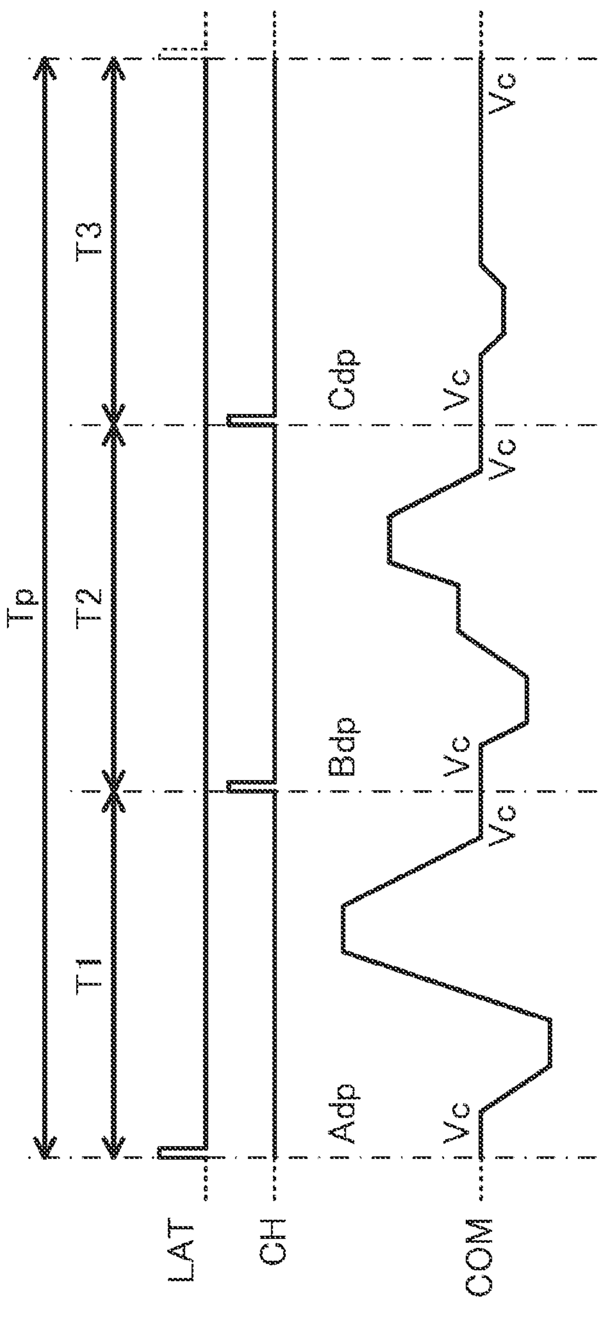
FIG. 3 is a diagram illustrating an example of the signal waveform of a drive signal.

FIG. 3 is a diagram illustrating an example of the signal waveform of the drive signal COM. As illustrated in FIG. 3, the drive signal COM includes a trapezoid wave Adp in a period T1 from when the latch signal LAT rises to when the change signal CH rises, a trapezoid wave Bdp in a period T2 from when the change signal CH rises to when the change signal CH rises next, and a trapezoid waveform Cdp in a period T3 from when the change signal CH rises to when the latch signal LAT rises. That is, the drive signal COM includes the trapezoid waves Adp, Bdp, and Cdp, which are in a period Tp from when the latch signal LAT first rises to when the latch signal LAT next rises. In other words, the drive signal output circuit 50 outputs the drive signal COM including the trapezoid waves Adp, Bdp, and Cdp at the timing specified by the latch signal LAT under the control of the head control circuit 20-1.

The trapezoid wave Adp is a signal waveform that drives the piezoelectric element 60 so as to discharge a predetermined amount of ink from the discharge section 600 corresponding to the piezoelectric element 60 when the signal waveform is supplied to the piezoelectric element 60. The trapezoid wave Bdp is a signal waveform that drives the piezoelectric element 60 so as to discharge a smaller amount of ink than a predetermined amount from the discharge section 600 corresponding to the piezoelectric element 60 when the signal waveform is supplied to the piezoelectric element 60. The trapezoid wave Cdp is a signal waveform that drives the piezoelectric element 60 so as not to discharge ink from the discharge section 600 corresponding to the piezoelectric element 60 when the signal waveform is supplied to the piezoelectric element 60. Here, when the trapezoid wave Cdp is supplied to the piezoelectric element 60, the piezoelectric element 60 causes the ink in the vicinity of the nozzle opening of the corresponding discharge section 600 to vibrate. Thereby, a risk of increasing the ink viscosity in the vicinity of the nozzle opening is reduced.

The start and the end of all of the trapezoid waves Adp, Bdp, and Cdp is a common voltage value Vc. That is, the trapezoid waves Adp, Bdp, and Cdp start and end at the voltage Vc.

In the following description, a predetermined amount of ink discharged from the discharge section 600 corresponding to the piezoelectric element 60 when the trapezoid wave Adp is supplied to the piezoelectric element 60 is sometimes referred to as a medium amount. The amount of ink, which is smaller than a predetermined amount, discharged from the discharge section 600 corresponding to the piezoelectric element 60 when the trapezoid wave Bdp is supplied to the piezoelectric element 60 is sometimes referred to as a small amount. Also, the operation for preventing an increase in ink viscosity in the vicinity of the nozzle opening of the discharge section 600 corresponding to the piezoelectric element 60 when the trapezoid wave Cdp is supplied to the piezoelectric element 60 is sometimes referred to as micro vibration.

In this regard, the signal waveform of the drive signal COM illustrated in FIG. 3 is an example and is not limited to this. That is, the signal waveform of the drive signal COM may be a set of various signal waveforms in accordance with the quality of the ink to be discharged, the quality of the material of the medium on which ink lands, and the like. Also, the drive signal output circuit 50 may generate and output a drive signal COM including a signal waveform for detecting the residual vibration described above in addition to or in place of the trapezoid waves Adp, Bdp, and Cdp illustrated in FIG. 3.

The drive signal selection circuit 200 according to the present embodiment determines each of the trapezoid waves Adp, Bdp, and Cdp to be selected or deselected in the period Tp including the periods T1, T2, and T3 so as to control the amount of ink discharged from the discharge section 600. That is, the size of a dot formed on a medium is controlled for each period Tp specified by the latch signal LAT.

Figure 4:
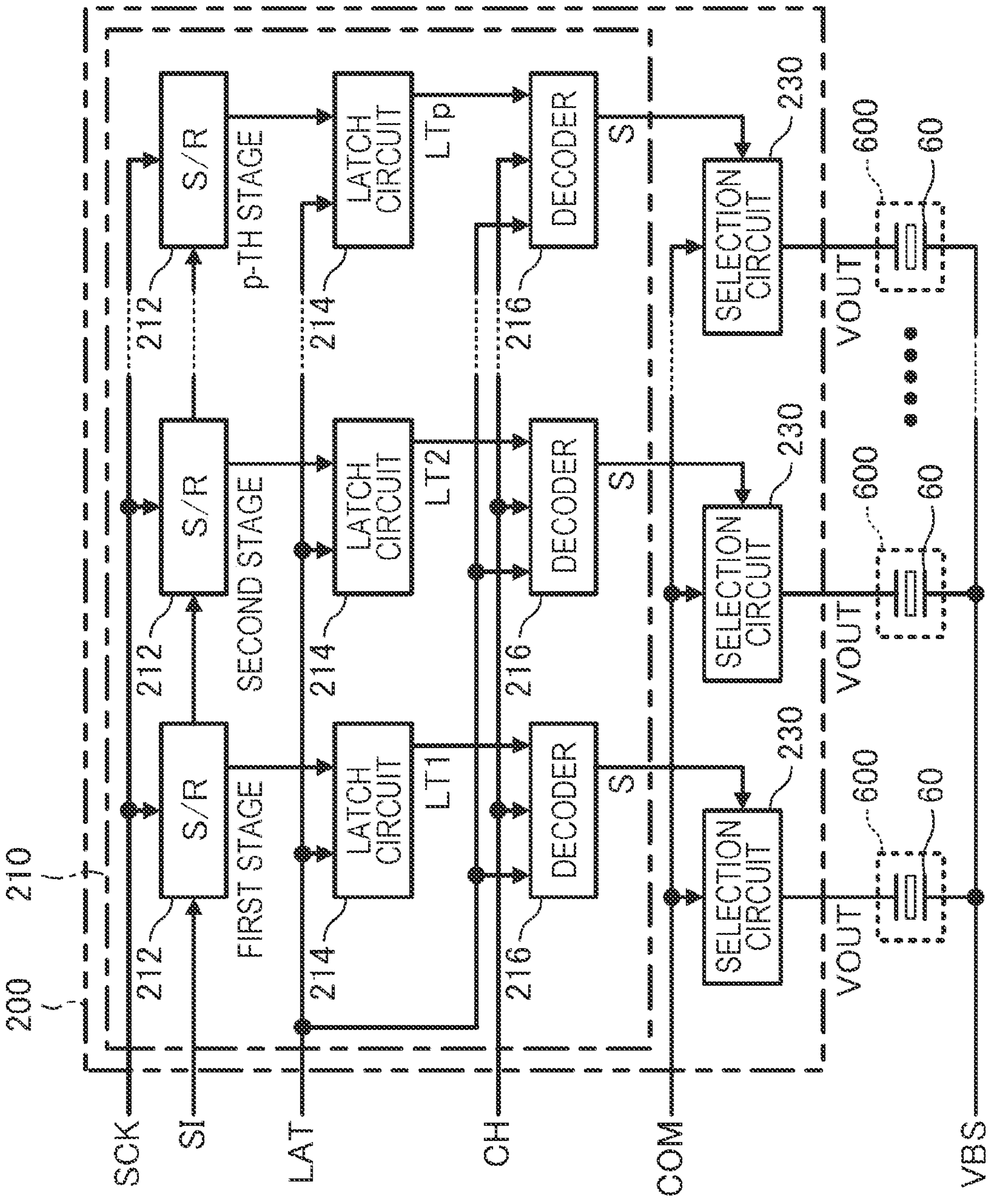
FIG. 4 is a diagram illustrating the configuration of a drive signal selection circuit.

FIG. 4 is a diagram illustrating the configuration of the drive signal selection circuit 200. As illustrated in FIG. 4, the drive signal selection circuit 200 includes a selection control circuit 210 and a plurality of selection circuits 230.

The selection control circuit 210 receives the input of the system clock signal SCK, the print data signal SI, the latch signal LAT, and the change signal CH. Also, sets of a shift register (S/R) 212, a latch circuit 214, and a decoder 216 are disposed to correspond to the respective discharge sections 600 in the selection control circuit 210. That is, when the discharge head 100 includes p discharge sections 600, the drive signal selection circuit 200 includes p shift registers 212, p latch circuits 214, and p decoders 216.

The print data signal SI is input to the selection control circuit 210 synchronously with the system clock signal SCK. The print data signal SI includes two-bit print data [SIH, SIL] in series for selecting any one of "large dot LD", "medium dot MD", "small dot SD", and "non-recording ND" in correspondence with the respective p discharge sections 600. That is, the print data signal SI is at least a 2p-bit serial signal. The print data [SIH, SIL] included in the print data signal SI is held in the p shift registers 212 corresponding to the respective p discharge sections 600.

Specifically, the p shift registers 212 corresponding to the respective discharge sections 600 are cascaded with each other, and the print data signal SI that is input in series is transferred to the shift registers 212 of the latter stages in sequence in accordance with the system clock signal SCK. When the print data [SIH, SIL] is held in the corresponding shift registers 212, transmission of the system clock signal SCK is stopped. In other words, by stopping the transmission of the system clock signal SCK, the print data [SIH, SIL] included in the print data signal SI is held in the corresponding shift registers 212. In this regard, a description is given with respect to FIG. 4 of a first stage, a second stage, . . . , and the p-th stage in order from the upstream side of the input of the print data signal SI to distinguish p shift registers 212.

Figures 5, 6:
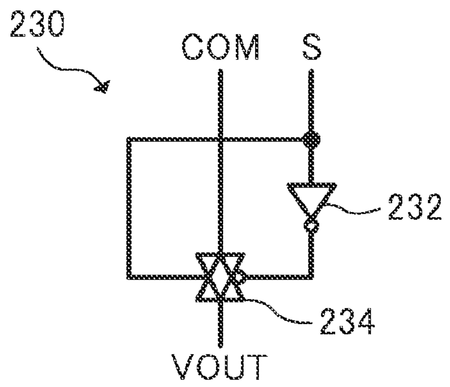
FIG. 5 is a diagram illustrating an example of the decoded contents by a decoder.
FIG. 6 is a diagram illustrating the configuration of a selection circuit.

Each of the p latch circuits 214 latches the print data [SIH, SIL] held in the corresponding shift register 212 at the rising of the latch signal LAT. The print data [SIH, SIL] latched by the latch circuit 214 is then input to the corresponding decoder 216. FIG. 5 is a diagram illustrating an example of the decode contents of the decoder 216. The decoder 216 outputs a selection signal S having a logic level defined by the input print data [SIH, SIL] in the respective periods T1, T2, and T3. For example, when the value of the print data [SIH, SIL] input to the decoder 216 is [1, 0], the decoder 216 outputs the selection signal S having logic levels of H, L, and L in the periods T1, T2, and T3, respectively.

The selection signal S output by the decoder 216 is input to the selection circuit 230. The selection circuits 230 are disposed in correspondence with the respective p discharge sections 600. That is, the drive signal selection circuit 200 includes p selection circuits 230, where p is the same number as that of the discharge sections 600. FIG. 6 is a diagram illustrating the configuration of the selection circuit 230 corresponding to one discharge section 600. As illustrated in FIG. 6, the selection circuit 230 includes an inverter 232 which is a NOT circuit and a transfer gate 234.

The selection signal S is input to the positive control end (indicated by a circle) of the transfer gate 234, and its logic level is then inverted by the inverter 232 and input to the negative control end (not indicated by a circle) of the transfer gate 234. The drive signal COM is supplied to the input end of the transfer gate 234. When an H-level selection signal S is input to the transfer gate 234, the input end and the output end become conductive, whereas when an L-level selection signal S is input, the input end and the output end become non-conductive. That is, when the logic level of the selection signal S input to the transfer gate 234 is H, the signal waveform included in the drive signal COM is output from the output end, whereas when the logic level of the selection signal S input to the transfer gate 234 is L, the signal waveform included in the drive signal COM is not output from the output end.

The drive signal selection circuit 200 then outputs the signal output at the output end of the transfer gate 234 of the selection circuit 230 as the drive signal VOUT.

Figure 7:
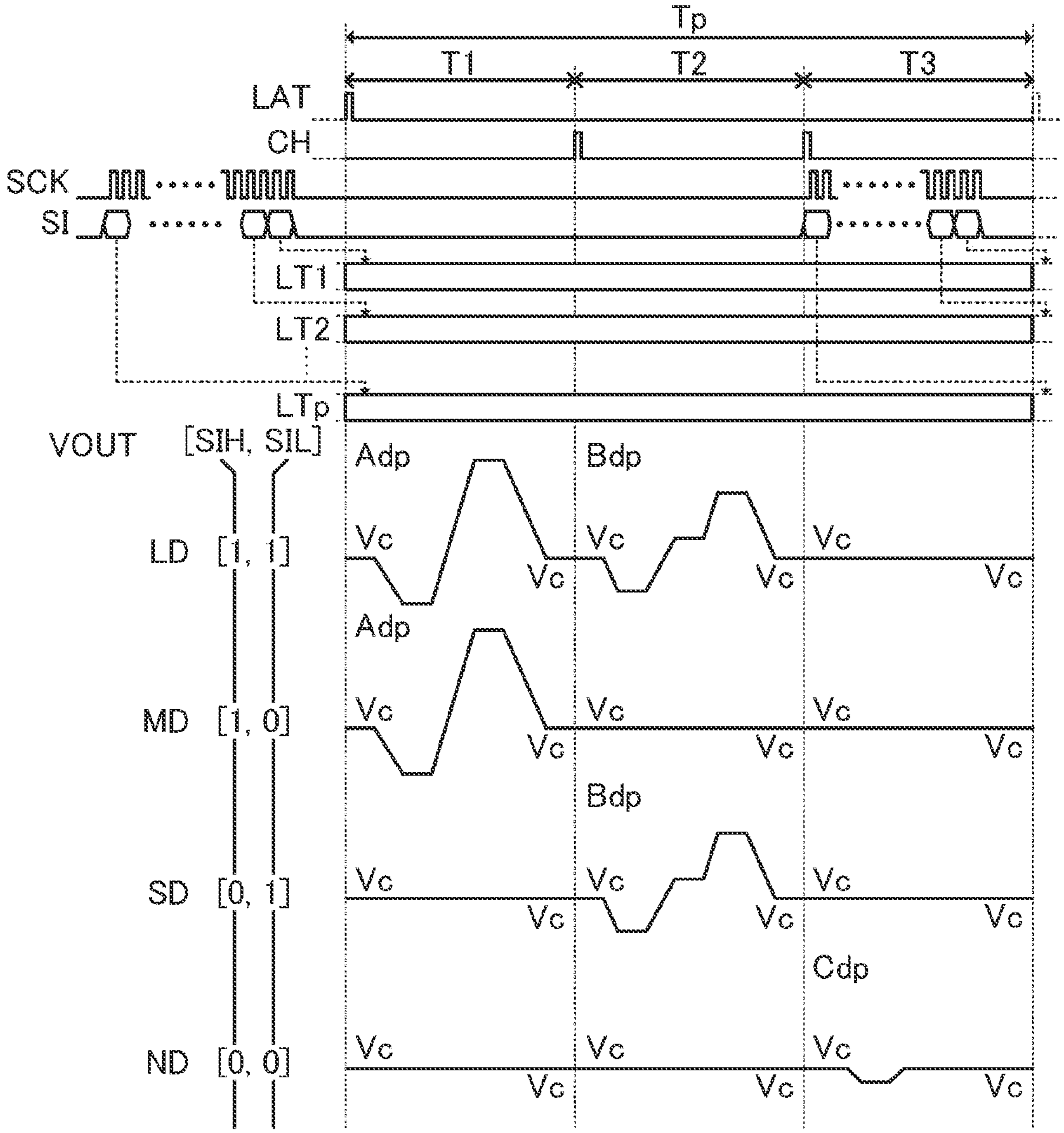
FIG. 7 is an explanatory diagram of the operation of a drive signal selection circuit.

Here, a description will be given of the operation of the drive signal selection circuit 200 with reference to FIG. 7. FIG. 7 is an explanatory diagram of the operation of the drive signal selection circuit 200. The print data signal SI is input to the selection control circuit 210 as a serial signal synchronously with the system clock signal SCK. The print data signal SI is transferred in sequence in the p shift registers 212 corresponding to the respective p discharge sections 600 synchronously with the system clock signal SCK. Then, when the input of the system clock signal SCK is stopped, the print data [SIH, SIL] corresponding to the respective p discharge sections 600 are held in the shift registers 212.

When the latch signal LAT then rises, the latch circuits 214 individually latch the print data [SIH, SIL] held in the respective shift registers 212 at the same time.

In this regard, references LT1, LT2, . . . , LTp illustrated in FIG. 7 indicate the print data [SIH, SIL] latched by the latch circuits 214 corresponding to the first stage, the second stage, . . . , and the p-th stage shift registers 212, respectively.

The decoder 216 outputs the selection signal S having logic levels as illustrated in FIG. 5 in accordance with the dot size specified by the latched print data [SIH, SIL] in the respective periods T1, T2, and T3. The selection circuit 230 then determines the signal waveform included in the drive signal COM to be selected or deselected in accordance with the logic level of the selection signal S output by the decoder 216 so as to generate the drive signal VOUT.

Specifically, when the value of the print data [SIH, SIL] input to the decoder 216 is [1, 1], the decoder 216 determines the logic levels of the selection signal S to be H, H, an L in the periods T1, T2, and T3, respectively. Thereby, the selection circuit 230 selects the trapezoid wave Adp in the period T1 and the trapezoid wave Bdp in the period T2 and does not select the trapezoid wave Cdp in the period T3. As a result, in the period Tp, the drive signal selection circuit 200 outputs the drive signal VOUT corresponding to "large dot LD".

When the drive signal VOUT corresponding to "large dot LD" is supplied to the piezoelectric element 60 of the discharge section 600, the discharge section 600 discharges a medium amount of ink in the period T1, discharges a small amount of ink in the period T2 and does not discharge ink in the period T3. The medium amount of ink and the small amount of ink, which have been discharged from the discharge section 600, are combined so as to correspond to "large dot LD" and land on the medium.

When the value of the print data [SIH, SIL] input to the decoder 216 is [1, 0], the decoder 216 determines the logic levels of the selection signal S to be H, L, and L in the periods T1, T2, and T3, respectively. Thereby, the selection circuit 230 selects the trapezoid wave Adp in the period T1, does not select the trapezoid wave Bdp in the period T2, and does not select the trapezoid wave Cdp in the period T3. As a result, the drive signal selection circuit 200 outputs the drive signal VOUT corresponding to "medium dot MD".

When the drive signal VOUT corresponding to "medium dot MD" is supplied to the piezoelectric element 60 of the discharge section 600, the discharge section 600 discharges a medium amount of ink in the period T1, does not discharge ink in the period T2, and does not discharge ink in the period T3. The medium amount of ink corresponding to "medium dot MD" is discharged from the discharge section 600 and lands on the medium.

When the value of the print data [SIH, SIL] input to the decoder 216 is [0, 1], the decoder 216 determines the logic levels of the selection signal S to be L, H, and L in the periods T1, T2, and T3, respectively. Thereby, the selection circuit 230 does not select the trapezoid wave Adp in the period T1, selects trapezoid wave Bdp in the period T2, and does not select the trapezoid wave Cdp in the period T3. As a result, the drive signal selection circuit 200 outputs the drive signal VOUT corresponding to "small dot SD".

When the drive signal VOUT corresponding to "small dot SD" is supplied to the piezoelectric element 60 of the discharge section 600, the discharge section 600 does not discharge ink in the period T1, discharges a small amount of ink in the period T2, and does not discharge ink in the period T3. The small amount of ink corresponding to "small dot SD" is discharged from the discharge section 600 and lands on the medium.

When the value of the print data [SIH, SIL] input to the decoder 216 is [0, 0], the decoder 216 determines the logic levels of the selection signal S to be L, L, and H in the periods T1, T2, and T3, respectively. Thereby, the selection circuit 230 does not select trapezoid wave Adp in the period T1, does not select trapezoid wave Bdp in the period T2, and selects the trapezoid wave Cdp in the period T3. As a result, the drive signal selection circuit 200 outputs the drive signal VOUT corresponding to "non-recording ND".

When the drive signal VOUT corresponding to "non-recording ND" is supplied to the piezoelectric element 60 of the discharge section 600, the discharge section 600 does not discharge ink in the period T1, does not discharge ink in the period T2, and does not discharge ink in the period T3. Accordingly, ink is not discharged from the discharge section 600, which results in "non-recording ND", in which no dot is formed on the medium.

At this time, the corresponding selection circuit 230 outputs the drive signal VOUT including the trapezoid wave Cdp. Accordingly, micro vibration is performed on the corresponding discharge section 600. As a result, a risk of increasing the viscosity of the ink in the vicinity of the nozzle opening of the corresponding discharge section 600 is reduced.

As described above, in the liquid discharge apparatus 1 according to the present embodiment, the drive signal output circuit 50 outputs the drive signal COM including the trapezoid waves Adp, Bdp, and Cdp for each period Tp specified by the latch signal LAT, and the drive signal selection circuit 200 changes in accordance with whether the trapezoid waves Adp, Bdp, and Cdp included in the drive signal COM are to be selected or deselected for each period Tp specified by the latch signal LAT. Thereby, dots corresponding to "large dot LD", "medium dot MD", "small dot SD", and "non-recording ND" are respectively formed on the medium for each period Tp specified by the latch signal LAT.

3. Configuration and Operation of PTS Output Circuit

As described above, the liquid discharge apparatus 1 according to the present embodiment includes: the head control circuit 20-1 that outputs the reference drive signal dA, the system clock signal SCK1, the latch signal LAT1, the change signal CH1, and the print data signals SI1 to SI3; the head control circuit 20-2 that outputs the system clock signal SCK2, the latch signal LAT2, the change signal CH2, and the print data signals SI4 to SI6; the drive signal output circuit 50 that outputs the drive signal COM in accordance with the reference drive signal dA; the discharge heads 100-1 to 100-3 including the respective discharge sections 600 that discharge ink onto the medium in accordance with the drive signal COM, the system clock signal SCK1, the latch signal LAT1, the change signal CH1, and the corresponding print data signals SI1 to SI3; and the discharge heads 100-4 to 100-6 including the respective discharge sections 600 that discharge ink onto the medium in accordance with the drive signal COM, the system clock signal SCK2, the latch signal LAT2, the change signal CH2, and the corresponding print data signals SI4 to SI6.

The liquid discharge apparatus 1 according to the present embodiment includes the discharge heads 100-1 to 100-3 which are controlled by the head control circuit 20-1 and the discharge heads 100-4 to 100-6 which are controlled by the head control circuit 20-2, with the discharge heads 100-1 to 100-6 being supplied with the drive signal COM generated by the drive signal output circuit 50 in accordance with the reference drive signal dA output by the head control circuit 20-1.

In the liquid discharge apparatus 1 described above, the common drive signal COM is supplied to the discharge heads 100-1 to 100-3 controlled by the head control circuit 20-1 and the discharge heads 100-4 to 100-6 controlled by the head control circuit 20-2. At this time, in consideration of the point at which the period Tp of the signal waveform of the drive signal COM is specified by the latch signal LAT1, when a difference occurs between the operation timings of the head control circuit 20-1 and the head control circuit 20-2, more specifically, when a difference occurs between the timing at which the head control circuit 20-1 outputs the latch signal LAT1, the change signal CH1, and the system clock signal SCK1 and the timing at which the head control circuit 20-2 outputs the latch signal LAT2, the change signal CH2, and the system clock signal SCK2, a difference occurs between the timing at which the respective drive signal selection circuits 200 of the discharge heads 100-1 to 100-3 determine the signal waveform of the drive signal COM to be selected or deselected and the timing at which the respective drive signal selection circuits 200 of the discharge heads 100-4 to 100-6 determine the signal waveform of the drive signal COM to be selected or deselected. As a result, distortion might occur in the signal waveform of the drive signal VOUT supplied to the discharge heads 100-4 to 100-6 from which discharge is controlled by the head control circuit 20-2 that does not contribute to the generation of the drive signal COM. Accordingly, there is a risk of decreasing the discharge accuracy of ink discharged from the discharge heads 100-4 to 100-6.

When a difference occurs between the timing when the head control circuit 20-1 outputs the latch signal LAT1, the change signal CH1, and the system clock signal SCK1 and the timing when the head control circuit 20-2 outputs the latch signal LAT2, the change signal CH2, and the system clock signal SCK2, there is a possibility that the respective selection circuits 230 of the discharge heads 100-4 to 100-6 whose discharge is controlled by the head control circuit 20-2 might be controlled to be conductive when the drive signal COM voltage is high. When the respective selection circuits 230 of the discharge heads 100-4 to 100-6 whose discharge is controlled by the head control circuit 20-2 are controlled to be conductive when the drive signal COM is high, the drive signal VOUT whose voltage value changes abruptly is supplied to the corresponding piezoelectric elements 60. Thereby, a load is abruptly applied to the piezoelectric element 60, and thus there is a possibility that the piezoelectric element 60 might be damaged. When the piezoelectric element 60 is damaged, the discharge accuracy of the discharge heads 100-4 to 100-6 is significantly decreased.

Regarding such a problem, in the liquid discharge apparatus 1 according to the present embodiment, the PTS signal output circuit 30 outputs the common operation timing signal PTS to the head control circuit 20-1 and the head control circuit 20-2, and thus both the head control circuit 20-1 and the head control circuit 20-2 operate in accordance with the input operation timing signal PTS so as to synchronize the operation timings of the head control circuit 20-1 and the head control circuit 20-2. Thereby, in the liquid discharge apparatus 1, a risk of decreasing the discharge accuracy of ink is reduced, and a risk of an abnormality occurring in the piezoelectric element 60 is reduced.

Figure 8:
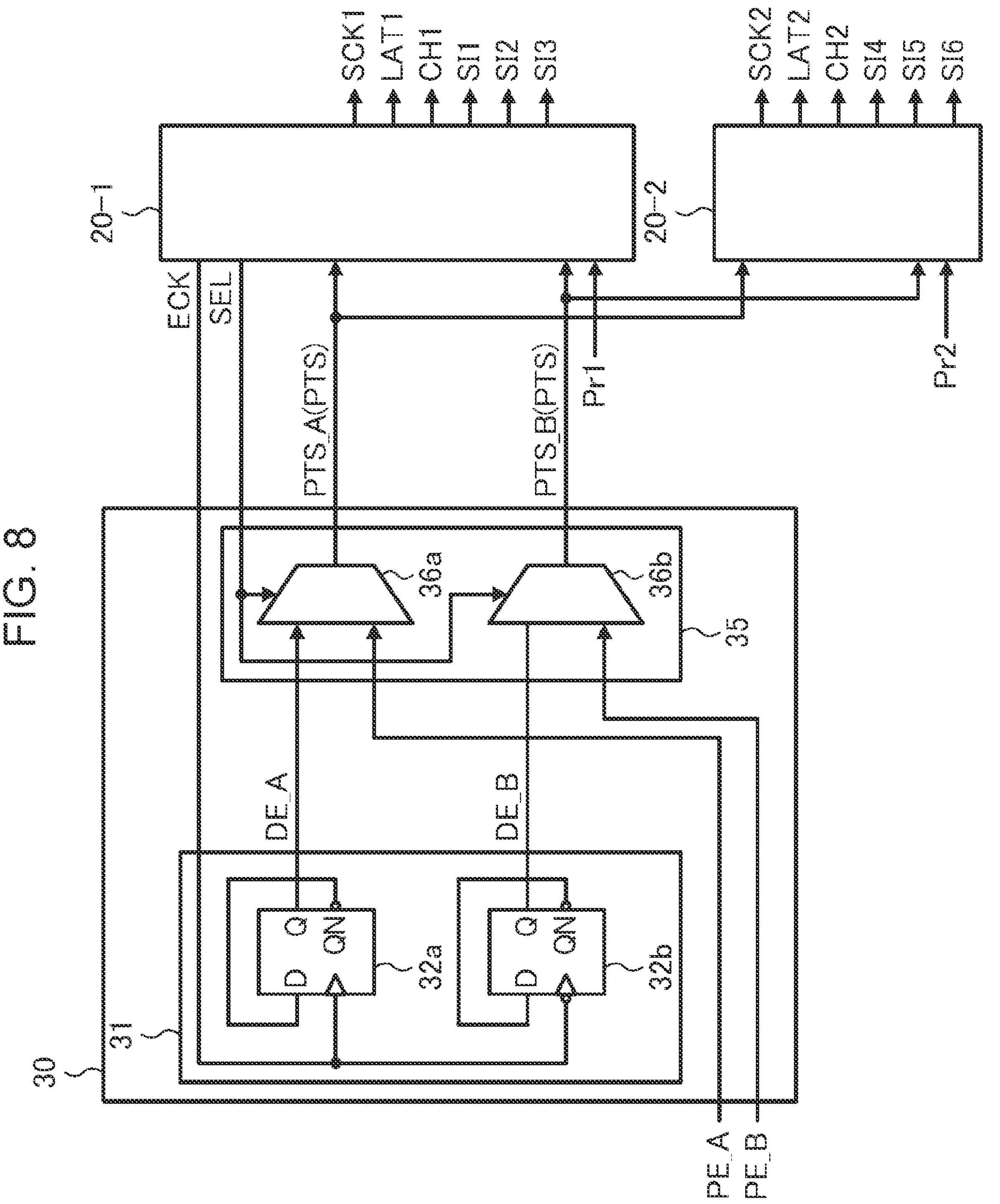
FIG. 8 is a diagram illustrating an example of the configuration of a PTS signal output circuit.

A description will be given of the configuration and the operation of the PTS signal output circuit 30 that outputs the operation timing signal PTS specifying the head control circuits 20-1 and 20-2 described above. FIG. 8 is a diagram illustrating an example of the configuration of the PTS signal output circuit 30. As illustrated in FIG. 8, the PTS signal output circuit 30 includes a pseudo-encoder circuit 31 and a select circuit 35. As described above, the PTS signal output circuit 30 receives the input of the encoder signal PE_A and the encoder signal PE_B as the encoder signal PE_A/B output by the encoder sensor 43, the select signal SEL output by the head control circuit 20-1, and the encoder clock signal ECK.

The pseudo-encoder circuit 31 includes a D-FF (flip-flop) circuit 32*a* and a D-FF circuit 32*b*.

The encoder clock signal ECK is input to the clock input terminal of the D-FF circuit 32*a*. The input terminal and the inverted output terminal of the D-FF circuit 32*a* are electrically coupled. The D-FF circuit 32*a* then outputs a pseudo-encoder signal DE_A from the normal output terminal. The logic level of the pseudo-encoder signal DE_A output by the D-FF circuit 32*a* is inverted synchronously with a rise of the encoder clock signal ECK.

A signal corresponding to an inverted logic signal of the encoder clock signal ECK is input to the clock input terminal of the D-FF circuit 32*b*. The input terminal and the inverted output terminal of the D-FF circuit 32*b* are electrically coupled. The D-FF circuit 32*b* then outputs a pseudo-encoder signal DE_B from the normal output terminal. The logic level of the pseudo-encoder signal DE_B output by the D-FF circuit 32*b* is inverted synchronously with a fall of the encoder clock signal ECK.

The D-FF circuit 32*a* outputs the pseudo-encoder signal DE_A whose frequency is ½ that of the input encoder clock signal ECK, and the D-FF circuit 32*b* outputs the pseudo-encoder signal DE_B whose frequency is ½ that of the input encoder clock signal ECK and whose phase is delayed by 90 degrees with respect to the pseudo-encoder signal DE_A. In other words, the pseudo-encoder circuit 31 outputs the pseudo-encoder signal DE_A and the pseudo-encoder signal DE_B whose phase is delayed by 90 degrees with respect to the pseudo-encoder signal DE_A.

As described above, in accordance with the transport position of the medium and the relative positional relationship between the medium and the discharge heads 100-1 to 100-6, the encoder sensor 43 outputs the encoder signal PE_A and the encoder signal PE_B having a phase delayed by 90 degrees with respect to the encoder signal PE_A as the encoder signal PE_A/B relative positional relationship. At this time, the frequency of the encoder signal PE_A/B output by the encoder sensor 43 is proportional to the rotational speed of the transport roller 42 and is controlled by the transport speed of the medium being transported.

On the other hand, the pseudo-encoder circuit 31 outputs signals which do not depend on the transport position of the medium and the relative positional relationship between the medium and the discharge heads 100-1 to 100-6, that is, the pseudo-encoder signal DE_A output in accordance with the encoder clock signal ECK and the pseudo-encoder signal DE_B whose phase is delayed by 90 degrees with respect to the pseudo-encoder signal DE_A. At this time, the frequency of the pseudo-encoder signal DE_A and the frequency of the pseudo-encoder signal DE_B output by the pseudo-encoder circuit 31 are controlled by the frequency of the encoder clock signal ECK input from the head control circuit 20-1.

The pseudo-encoder circuit 31 generates and outputs, in accordance with the encoder clock signal ECK, the pseudo-encoder signals DE_A and DE_B which are signals simulating the encoder signal PE_A/B output by the encoder sensor 43 in the period in which the relative positional relationships between the medium and the discharge heads 100-1 to 100-6 change.

The select circuit 35 includes a selector 36*a* and a selector 36*b*. The selector 36*a* and the selector 36*b* are constituted by, for example, a multiplexer and select the signal input to the input terminal in accordance with the signal input to the control terminal and output the selected signal from the output terminal.

The input terminal of the selector 36*a* receives the input of the encoder signal PE_A output by the encoder sensor 43 and the pseudo-encoder signal DE_A output by the pseudo-encoder circuit 31. Also, the control terminal of the selector 36*a* receives the input of the select signal SEL output by the head control circuit 20-1. Thereby, the selector 36*a* selects either the encoder signal PE_A or the pseudo-encoder signal DE_A in accordance with the select signal SEL and outputs the selected signal as an operation timing signal PTS_A of the operation timing signal PTS. In the following, a description will be given on the assumption that when the logic level of the input select signal SEL is L, the selector 36*a* selects the encoder signal PE_A and outputs the signal as the operation timing signal PTS_A, whereas when the logic level of the select signal SEL is H, the selector 36*a* selects the pseudo-encoder signal DE_A and outputs the signal as the operation timing signal PTS_A.

The input terminal of the selector 36*b* receives the input of the encoder signal PE_B output by the encoder sensor 43 and the pseudo-encoder signal DE_B output by the pseudo-encoder circuit 31. Also, the control terminal of the selector 36*b* receives the input of the select signal SEL output by the head control circuit 20-1. Thereby, the selector 36*b* selects either the encoder signal PE_B or the pseudo-encoder signal DE_B in accordance with the select signal SEL and outputs the selected signal as an operation timing signal PTS_B of the operation timing signal PTS. In the following, a description will be given on the assumption that when the logic level of the select signal SEL input to the selector 36*b* is L, the selector 36*b* selects the encoder signal PE_B and outputs the signal as the operation timing signal PTS_B, whereas when the logic level of the input select signal SEL is H, the selector 36*b* selects the pseudo-encoder signal DE_B and outputs the signal as the operation timing signal PTS_B.

When the select circuit 35 receives the input of an L-level select signal SEL from the head control circuit 20-1, the select circuit 35 outputs the encoder signal PE_A output by the encoder sensor 43 as the operation timing signal PTS_A and outputs the encoder signal PE_B as the operation timing signal PTS_B. When the select circuit 35 receives the input of an H-level select signal SEL from the head control circuit 20-1, the select circuit 35 outputs the pseudo-encoder signal DE_A output by the pseudo-encoder circuit 31 as the operation timing signal PTS_A and outputs the pseudo-encoder signal DE_B as the operation timing signal PTS_B.

The operation timing signal PTS_A and the operation timing signal PTS_B output by the select circuit 35 are output from the PTS signal output circuit 30 and input to the head control circuit 20-1 and the head control circuit 20-2 in common. The head control circuit 20-1 outputs the system clock signal SCK1, the latch signal LAT1, the change signal CH1, the print data signals SI1 to SI3, and the reference drive signal dA at the timing based on the operation timing signal PTS_A and the operation timing signal PTS_B, which are input as the operation timing signal PTS. Also, the head control circuit 20-2 outputs the system clock signal SCK2, the latch signal LAT2, the change signal CH2, and the print data signals SI4 to SI6 at the timing based on the operation timing signal PTS_A and the operation timing signal PTS_B, which are input as the operation timing signal PTS. Thereby, the operation timings of the head control circuit 20-1 and the head control circuit 20-2 are synchronized by the operation timing signal PTS_A and the operation timing signal PTS_B, which are input as the operation timing signal PTS.

As described above, the PTS signal output circuit 30 includes the selector 36*a* that changes whether to supply the encoder signal PE_A to the head control circuit 20-1 and the head control circuit 20-2 or to supply the pseudo-encoder signal DE_A to the head control circuit 20-1 and the head control circuit 20-2, and the selector 36*b* that changes whether to supply the encoder signal PE_B to the head control circuit 20-1 and the head control circuit 20-2 or to supply the pseudo-encoder signal DE_B to the head control circuit 20-1 and the head control circuit 20-2.

The selector 36*a* switches between supplying the encoder signal PE_A to the head control circuit 20-1 and the head control circuit 20-2 and supplying the pseudo-encoder signal DE_A to the head control circuit 20-1 and the head control circuit 20-2 in accordance with the select signal SEL output by the head control circuit 20-1. The selector 36*b* switches between supplying the encoder signal PE_B to the head control circuit 20-1 and the head control circuit 20-2 and supplying the pseudo-encoder signal DE_B to the head control circuit 20-1 and the head control circuit 20-2 in accordance with the select signal SEL output by the head control circuit 20-1.

Figure 9:
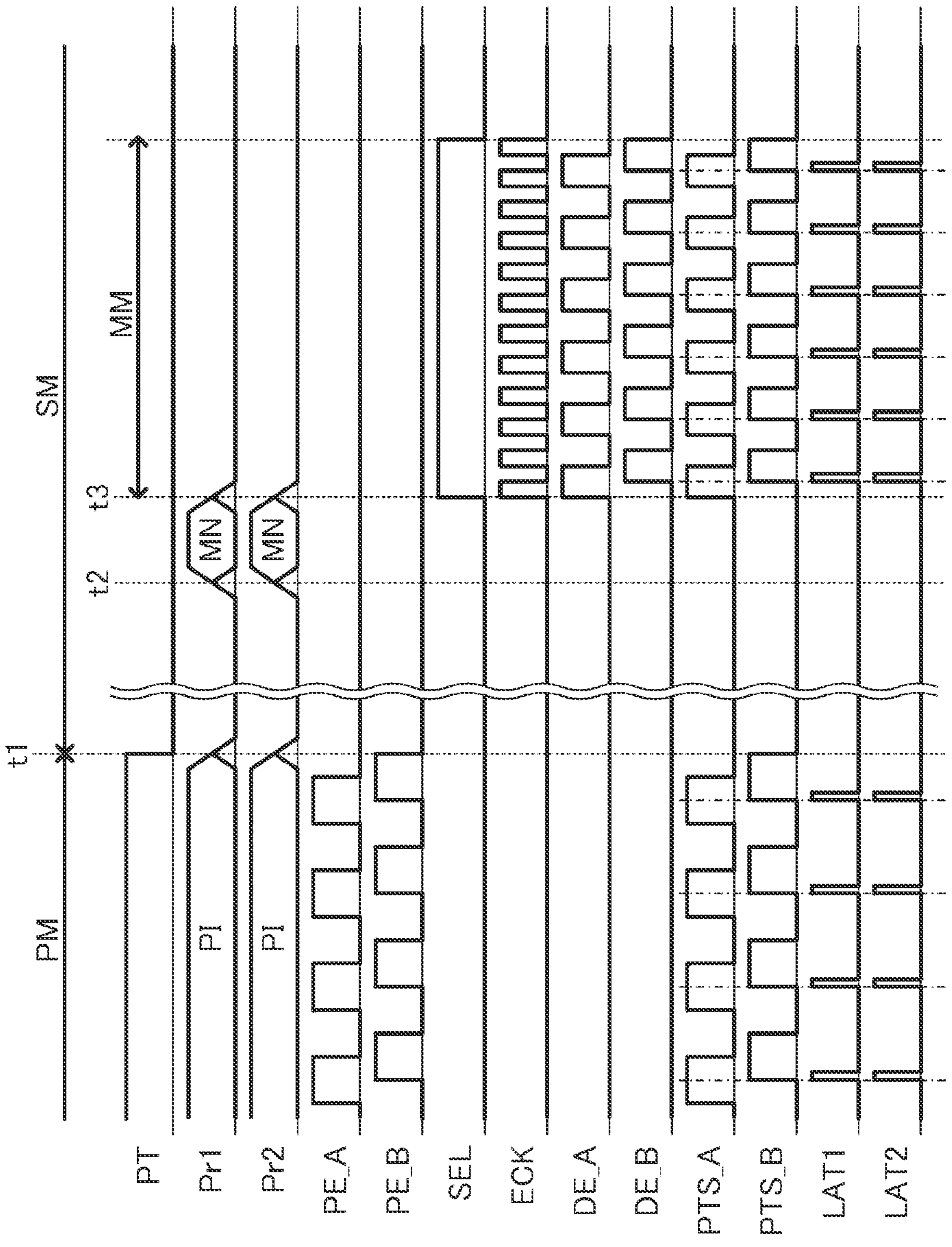
FIG. 9 is an explanatory diagram of a specific example of the operation of the PTS signal output circuit.

Next, a description will be given of a specific example of the operation of the PTS signal output circuit 30 in the liquid discharge apparatus 1 according to the present embodiment. FIG. 9 is an explanatory diagram of a specific example of the operation of the PTS signal output circuit 30. In this regard, a description will be given with reference to FIG. 9 on the assumption that when an H-level transport control signal PT is input from the main control circuit 10 to the transport mechanism 40, the transport mechanism 40 transports the medium in the transport direction, whereas when an L-level transport control signal PT is input from the main control circuit 10 to the transport mechanism 40, the transport mechanism 40 stops transporting the medium.

Before time t1, the liquid discharge apparatus 1 is performing so-called print processing in which ink is discharged onto the medium. That is, before time t1, the liquid discharge apparatus 1 operates in a print mode PM.

In the period in which the liquid discharge apparatus 1 operates in the print mode PM, the main control circuit 10 outputs an H-level transport control signal PT to the transport mechanism 40, outputs the image information signal Pr1 including the print information PI corresponding to an image to be formed on the medium to the head control circuit 20-1, and outputs the image information signal Pr2 including the print information PI corresponding to the image to be formed on the medium to the head control circuit 20-2. Thereby, the medium is transported in the transport direction, and the discharge heads 100-1 to 100-6 discharge ink onto the medium being transported. That is, in the print mode PM, the H-level transport control signal PT is input to the transport mechanism 40 to change the relative positional relationships between the medium and the discharge heads 100-1 to 100-6, and the discharge heads 100-1 to 100-6 discharge ink in accordance with the relative positional relationships from the medium. Thereby, ink lands at a desired position of the medium to form a desired image on the medium.

In the print mode PM described above, the encoder sensor 43 outputs the encoder signal PE_A and the encoder signal PE_B in accordance with the transport of the medium, and the head control circuit 20-1 outputs the L-level select signal SEL and the L-level constant encoder clock signal ECK. Thereby, the select circuit 35 outputs the encoder signal PE_A as the operation timing signal PTS_A and outputs the encoder signal PE_B as the operation timing signal PTS_B. That is, the PTS signal output circuit 30 outputs the encoder signal PE_A as the operation timing signal PTS_A and outputs the encoder signal PE_B as the operation timing signal PTS_B.

Accordingly, the head control circuits 20-1 and 20-2 receive the input of the operation timing signal PTS_A including the encoder signal PE_A and the operation timing signal PTS_B including the encoder signal PE_B. In other words, the head control circuit 20-1 and the head control circuit 20-2 operate in the print mode PM in accordance with the operation timing signal PTS_A including the encoder signal PE_A and the operation timing signal PTS_B including the encoder signal PE_B.

At this time, when the logic level of the operation timing signal PTS_A including encoder signal PE_A is H, the logic level of the operation timing signal PTS_B including the encoder signal PE_B changes from L to H so that the head control circuit 20-1 outputs the latch signal LAT1 at an H level for a predetermined period. When the logic level of the operation timing signal PTS_A including the encoder signal PE_A is H, the logic level of the operation timing signal PTS_B including the encoder signal PE_B changes from L to H so that the head control circuit 20-2 outputs the latch signal LAT2 at an H level for a predetermined period.

The latch signal LAT1 output by the head control circuit 20-1 and the latch signal LAT2 output by the head control circuit 20-2 become the H level at substantially the same time in accordance with the timing encoder signal PE_A and the encoder signal PE_B. Thereby, in the print mode PM, the control of the discharge heads 100-1 to 100-3 and the control of the drive signal output circuit 50, which are performed by the head control circuit 20-1, and the control of the discharge heads 100-4 to 100-6, which is performed by the head control circuit 20-2, are synchronized. Accordingly, in the print mode PM, a risk of degrading the discharge accuracy of ink from the discharge heads 100-1 to 100-6 is reduced, and a risk of damaging the piezoelectric elements 60 is reduced.

Next, at time t1, the print processing is completed so that the print mode PM ends, and the liquid discharge apparatus 1 moves to a standby mode SM of waiting for an image signal to be input from an external device not illustrated in the figures. At this time, the main control circuit 10 outputs the L-level transport control signal PT to the transport mechanism 40. Accordingly, the transport mechanism 40 stops transporting the medium. As a result, the encoder signal PE_A and the encoder signal PE_B output by the encoder sensor 43 sustain at an L level or an H level. That is, the encoder sensor 43 stops outputting the encoder signal PE_A and the encoder signal PE_B.

At this time, the head control circuits 20-1 and 20-2 receive the input of the operation timing signal PTS_A including the L-level encoder signal PE_A and the operation timing signal PTS_B including the L-level encoder signal PE_B. Accordingly, the head control circuit 20-1 outputs the L-level latch signal LAT1, and the head control circuit 20-2 outputs the L-level latch signal LAT2. That is, the head control circuit 20-1 stops outputting the latch signal LAT1, and the head control circuit 20-2 stops outputting the latch signal LAT2.

At predetermined time t2 after the liquid discharge apparatus 1 has entered the standby mode SM, the main control circuit 10 outputs the image information signal Pr1 including the maintenance information MN for performing the maintenance processing on the discharge heads 100-1 to 100-3 to the head control circuit 20-1 and outputs the image information signal Pr2 including the maintenance information MN for performing the maintenance processing on the discharge heads 100-4 to 100-6 to the head control circuit 20-2. Thereby, in the standby mode SM, the liquid discharge apparatus 1 enters the maintenance mode MM for performing the maintenance processing. Here, the maintenance processing performed on the discharge heads 100-1 to 100-6 in the maintenance mode MM includes, for example, obtaining residual signals for detecting the states of the discharge sections 600 included in the corresponding discharge heads 100-1 to 100-6 and flushing processing that discharges ink stored in the corresponding discharge sections 600 at the same time for maintaining and restoring the respective states of the discharge heads 100-1 to 100-6, and the other processing. That is, in the maintenance mode MM, the discharge heads 100-1 to 100-6 individually detect residual vibrations that occur after the corresponding piezoelectric elements 60 are driven or perform the flushing operation.

Specifically, at time t3 after the input of the image information signal Pr1 including the maintenance information MN for performing the maintenance processing is completed, the head control circuit 20-1 outputs the H-level select signal SEL and the encoder clock signal ECK.

The pseudo-encoder circuit 31 outputs the pseudo-encoder signal DE_A in accordance with the frequency of the input encoder clock signal ECK and the pseudo-encoder signal DE_B whose phase is delayed by 90 degrees with respect to the pseudo-encoder signal DE_A and in accordance with the frequency of the encoder clock signal ECK. The select circuit 35 selects the pseudo-encoder signal DE_A output by the pseudo-encoder circuit 31 as the operation timing signal PTS_A and selects the pseudo-encoder signal DE_B output by the pseudo-encoder circuit 31 as the operation timing signal PTS_B. That is, the PTS signal output circuit 30 outputs the pseudo-encoder signal DE_A as the operation timing signal PTS_A and outputs the pseudo-encoder signal DE_B as the operation timing signal PTS_B.

Accordingly, the head control circuits 20-1 and 20-2 receive the input of the operation timing signal PTS_A including the pseudo-encoder signal DE_A and the operation timing signal PTS_B including the pseudo-encoder signal DE_B. That is, in the maintenance mode MM in the standby mode SM, the PTS signal output circuit 30 generates the pseudo-encoder signals DE_A and DE_B simulating the encoder signal PE_A/B output by the encoder sensor 43 in the period in which the relative positional relationships between the medium and the discharge heads 100-1 to 100-6 change in the print mode PM in accordance with the encoder clock signal ECK and outputs the signals. Thereby, in the maintenance mode MM in the standby mode SM in which the medium is not transported and the relative positional relationships between the medium and the discharge heads 100-1 to 100-6 do not change, the head control circuit 20-1 and the head control circuit 20-2 operate in accordance with the operation timing signal PTS_A including the pseudo-encoder signal DE_A, and the operation timing signal PTS_B including the pseudo-encoder signal DE_B.

When the logic level of the operation timing signal PTS_A including the pseudo-encoder signal DE_A is H, the logic level of the operation timing signal PTS_B including the pseudo-encoder signal DE_B changes from L to H so that the head control circuit 20-1 outputs the latch signal LAT1 that becomes the H level in a predetermined period. When the logic level of the operation timing signal PTS_A including the pseudo-encoder signal DE_A is H, the logic level of the operation timing signal PTS_B including the pseudo-encoder signal DE_B is changed from L to H so that the head control circuit 20-2 outputs the latch signal LAT2 that becomes the H level in a predetermined period.

The latch signal LAT1 output by the head control circuit 20-1 and the latch signal LAT2 output by the head control circuit 20-2 become the H level at substantially the same timing in accordance with the pseudo-encoder signal DE_A and the pseudo-encoder signal DE_B. Thereby, when the discharge heads 100-1 to 100-6 are driven in the standby mode SM in which the transport of the medium is stopped, and, for example, in the maintenance mode MM in which the maintenance processing of the discharge heads 100-1 to 100-6 is performed, the control of the discharge heads 100-1 to 100-3 and the drive signal output circuit 50, performed by the head control circuit 20-1, and the control of the discharge heads 100-4 to 100-6, performed by the head control circuit 20-2, are synchronized. Accordingly, in the maintenance mode MM in the standby mode SM, a risk of degrading the discharge accuracy of ink from the discharge heads 100-1 to 100-6 is reduced, and a risk of damaging the piezoelectric elements 60 is reduced.

Here, the head control circuit 20-1 is an example of the first control circuit, and at least one of the system clock signal SCK1, the latch signal LAT1, the change signal CH1, and the print data signal SI1, which are output by the head control circuit 20-1, is an example of the first discharge control signal. The head control circuit 20-2 is an example of the second control circuit, and at least one of the system clock signal SCK2, the latch signal LAT2, the change signal CH2, and the print data signal SI4, which are output by the head control circuit 20-2, is an example of the second discharge control signal. Also, the drive signal output circuit that outputs the drive signal COM based on the reference drive signal dA output by the head control circuit 20-1 is an example of the drive circuit. The drive signal COM output by the drive signal output circuit 50 and the drive signal VOUT based on the drive signal COM represent an example of the drive signal. Any one of the plurality of discharge sections 600 included in the discharge head 100-1 is an example of the first discharge section, and any one of the plurality of discharge sections 600 included in the discharge head 100-4 is an example of the second discharge section. Also, the encoder sensor 43 is an example of the first timing signal output circuit, one of the encoder signal PE_A and the encoder signal PE_B, which are output by the encoder sensor 43 is an example of the first timing signal. The pseudo-encoder circuit 31 is an example of the second timing signal output circuit, and one of the pseudo-encoder signal DE_A and the pseudo-encoder signal DE_B is an example of the second timing signal. Also, the encoder clock signal ECK output by the head control circuit 20-1 is an example of the clock signal, the select signal SEL is an example of the selector control signal, and one of the selector 36*a* and 36*b* is an example of the selector. The print mode PM is an example of the first mode, and the maintenance mode MM is an example of the second mode.

4. Advantages

As described above, the liquid discharge apparatus 1 according to the present embodiment includes the encoder sensor 43 that outputs the encoder signal PE_A and the encoder signal PE_B in accordance with the relative positional relationships between the medium and the discharge heads 100-1 to 100-6, and the pseudo-encoder circuit 31 that outputs the pseudo-encoder signal DE_A and the pseudo-encoder signal DE_B. In the print mode PM in which the relative positional relationships between the medium and the discharge heads 100-1 to 100-6 change, the head control circuit 20-1 that controls the operation of the drive signal output circuit 50 and the discharge heads 100-1 to 100-3, and the head control circuit 20-2 that controls the operation of the discharge heads 100-4 to 100-6 are operated in accordance with the encoder signal PE_A and the encoder signal PE_B that are output by the encoder sensor 43. Whereas in the maintenance mode MM in the standby mode SM in which the relative positional relationships between the medium and the discharge heads 100-1 to 100-6 do not change, the head control circuit 20-1 that controls the operation of the drive signal output circuit 50 and the discharge heads 100-1 to 100-3, and the head control circuit 20-2 that controls the operation of the discharge heads 100-4 to 100-6 are operated in accordance with the pseudo-encoder signal DE_A and the pseudo-encoder signal DE_B.

Thereby, in the period in which the medium is transported, it is possible to discharge ink with the transport of the medium, and thus it is possible to increase the discharge accuracy of ink onto the medium. Also, in the period in which the medium is not transported, it is possible to synchronize the operation of the head control circuit 20-1 and the head control circuit 20-2. That is, in the liquid discharge apparatus 1 according to the present embodiment, when ink is discharged with the maintenance processing or the like in the period in which the medium is not transported, it is possible to synchronize the operation of the head control circuit 20-1 and the head control circuit 20-2, and thus a risk of damaging the respective piezoelectric elements 60 of the discharge heads 100-1 to 100-6 is reduced. As a result, a risk of degrading the discharge accuracy of ink caused by the damage of the piezoelectric elements 60 is reduced.

In the liquid discharge apparatus 1 according to the present embodiment, in the period in which the relative positional relationships between the medium and the discharge heads 100-1 to 100-6 are changed, the pseudo-encoder circuit 31 generates and outputs in accordance with the encoder clock signal ECK the pseudo-encoder signals DE_A and DE_B simulating the encoder signal PE_A/B output by the encoder sensor 43. Thereby, the head control circuit 20-1 and the head control circuit 20-2 are only required to perform the same processing when the operations thereof are synchronized by the encoder signal PE_A and the encoder signal PE_B, and when the operations thereof are synchronized by the pseudo-encoder signal DE_A and the pseudo-encoder signal DE_B, and thus it is possible to reduce the processing load of the head control circuits 20-1 and 20-2.

Further, in the liquid discharge apparatus 1 according to the present embodiment, one of the encoder signal PE_A output by the encoder sensor 43 and the pseudo-encoder signal DE_A output by the pseudo-encoder circuit 31 is selected by the selector **36*a*, and then is input to the head control circuits 20-1 and 20-2 as the operation timing signal PTS_A, and one of the encoder signal PE_B output by the encoder sensor 43 and the pseudo-encoder signal DE_B output by the pseudo-encoder circuit 31 is selected by the selector 36*b*, and then is input to the head control circuits 20-1 and 20-2 as the operation timing signal PTS_B. Thereby, it is not necessary for the head control circuit 20-1 and the head control circuit 20-2 to individually dispose the terminals that receive the pseudo-encoder signal DE_A and the pseudo-encoder signal DE_B respectively, and thus it is possible to reduce the number of respective terminals of the head control circuit 20-1 and the head control circuit 20-2, and it is possible to realize the miniaturization of the head control circuit 20-1 and the head control circuit 20-2**.

5. Variations

In the liquid discharge apparatus 1 according to the present embodiment, which is configured as described above, a description has been given on the assumption that a plurality of discharge heads 100 are controlled by the two head control circuits 20-1 and 20-2. However, when a plurality of discharge heads 100 are controlled by three or more head control circuits 20, the same advantages are obtained by supplying the operation timing signal PTS output by the PTS signal output circuit 30 to a plurality of the head control circuits 20 in common.

In the liquid discharge apparatus 1 according to the present embodiment, a description has been given on the assumption that the head control circuit 20-1 and the head control circuit 20-2 are synchronized in the print mode PM in accordance with the signal output by the encoder sensor 43 that detects the transport position of the medium. However, the liquid discharge apparatus 1 may include an encoder that detects the movement of the discharge heads 100-1 to 100-6, and the head control circuit 20-1 and the head control circuit 20-2 in the print mode PM may be synchronized in accordance with the signal output by the encoder.

In the above, descriptions have been given of the embodiments and the variations. However, the present disclosure is not limited to those embodiments. It is possible to carry out the present disclosure in various aspects without departing from the spirit and scope of the disclosure. For example, it is possible to suitably combine the embodiments described above.

The present disclosure includes a component having substantially the same component as described in the embodiments (for example, a component having the same function, a method and a result or a component having the same purpose and advantages). Also, the present disclosure includes a component described in the embodiments, of which nonessential part is replaced. Also, the present disclosure includes a component configured to have the same operational advantages or accomplish the same purposes as those of the component described in the embodiments. Also, the present disclosure includes a component produced by adding a publicly known technique to the component described in the embodiments.

The following contents are derived from the embodiments described above.

According to an aspect, there is provided a liquid discharge apparatus including: a first control circuit configured to output a reference drive signal and a first discharge control signal; a second control circuit configured to output a second discharge control signal; a drive circuit configured to output a drive signal in accordance with the reference drive signal; a first discharge section configured to discharge liquid onto a medium in accordance with the drive signal and the first discharge control signal; a second discharge section configured to discharge liquid onto the medium in accordance with the drive signal and the second discharge control signal; a first timing signal output circuit configured to output a first timing signal in accordance with a relative positional relationship between the medium and the first discharge section; and a second timing signal output circuit configured to output a second timing signal, wherein in a first mode in which the relative positional relationship between the medium and the first discharge section changes, the first control circuit and the second control circuit are operated in accordance with the first timing signal, whereas in a second mode in which the relative positional relationship between the medium and the first discharge section does not change, the first control circuit and the second control circuit are operated in accordance with the second timing signal.

The liquid discharge apparatus described above includes the first timing signal output circuit that outputs the first timing signal in accordance with the relative positional relationship between the medium and the first discharge section, and the second timing signal output circuit that discharges the second timing signal, and in the first mode in which the relative positional relationship between the medium and the first discharge section changes, the first control circuit and the second control circuit operate in accordance with the first timing signal, whereas in the second mode in which the relative positional relationship between the medium and the first discharge section does not change, the first control circuit and the second control circuit operate in accordance with the second timing signal. Thereby, when the medium is not transported, for example, in the period in which the print processing is not performed, it is possible to synchronize the operations of the first control circuit and the second control circuit. As a result, when the first discharge section and the second discharge section discharge liquid in the period in which the medium is not transported, a risk of degrading the discharge accuracy is reduced.

In the liquid discharge apparatus according to an aspect, the second timing signal output circuit may output in the second mode the second timing signal that simulates the first timing signal output by the first timing signal output circuit in the first mode.

In the liquid discharge apparatus according to an aspect, the second timing signal output circuit may output the second timing signal that simulates an output of the first timing signal output circuit in accordance with a clock signal output by the first control circuit.

With these liquid discharge apparatuses, when the first control circuit and the second control circuit operate in accordance with the first timing signal and when the first control circuit and the second control circuit operate in accordance with the second timing signal, the first control circuit and the second control circuit may perform the same processing, and thus it is possible to reduce the processing load of the first control circuit and the second control circuit.

The liquid discharge apparatus according to an aspect may include a selector that switches whether to supply the first timing signal to the first control circuit and the second control circuit or to supply the second timing signal to the first control circuit and the second control circuit.

In the liquid discharge apparatus according to an aspect, in accordance with a selector control signal output by the first control circuit, the selector may switch whether to supply the first timing signal to the first control circuit and the second control circuit or to supply the second timing signal to the first control circuit and the second control circuit.

With these liquid discharge apparatuses, the first timing signal and the second timing signal are input to the first control circuit via the common terminal, and the first timing signal and the second timing signal are input to the second control circuit via the common terminal so that it is possible to realize the miniaturization of the first control circuit and the second control circuit.

In the liquid discharge apparatus according to an aspect, the first discharge section may include a piezoelectric element driven by being supplied with the drive signal, and the first control circuit may obtain residual vibration that occurs after the piezoelectric element is driven in the second mode.

In the liquid discharge apparatus according to an aspect, the first discharge section may perform a flushing operation in the second mode.

What is claimed is:

1. A liquid discharge apparatus comprising:

a first control circuit configured to output a reference drive signal, a first discharge control signal, a select signal, and an encoder clock signal;

a second control circuit configured to output a second discharge control signal;

a drive circuit configured to output a drive signal in accordance with the reference drive signal;

a first discharge section configured to discharge liquid onto a medium in accordance with the drive signal and the first discharge control signal;

a second discharge section configured to discharge liquid onto the medium in accordance with the drive signal and the second discharge control signal;

a first timing signal output circuit configured to output a first timing signal in accordance with a relative positional relationship between the medium and the first discharge section; and an operation timing signal output circuit to which the select signal and the encoder clock signal are input from the first control circuit and to which the first timing signal is input from the first timing signal output circuit, the operation timing signal output circuit being configured to, in accordance with the select signal, the encoder clock signal, and the first timing signal, generate an operation timing signal that specifies operation timings of the first control circuit and the second control circuit and output the operation timing signal to the first control circuit and the second control circuit, the operation timing signal output circuit including a second timing signal output circuit configured to generate a second timing signal that simulates the first timing signal based on the encoder clock signal, wherein in a first mode in which the relative positional relationship between the medium and the first discharge section changes, the operation timing signal output circuit is configured to output the first timing signal as the operation timing signal to the first control circuit and the second control circuit, and the first control circuit and the second control circuit are operated in accordance with the first timing signal, whereas in a second mode in which the relative positional relationship between the medium and the first discharge section does not change, the second timing signal output circuit of the operation timing signal output circuit is configured to generate the second timing signal, the operation timing signal output circuit is configured to output the second timing signal as the operation timing signal to the first control circuit and the second control circuit, and the first control circuit and the second control circuit are operated in accordance with the second timing signal.

2. The liquid discharge apparatus according to claim 1, wherein the second timing signal output circuit generates the second timing signal that simulates an output of the first timing signal output circuit.

3. The liquid discharge apparatus according to claim 1 wherein the operation timing signal output circuit further includes a selector that switches whether to supply the first timing signal to the first control circuit and the second control circuit or to supply the second timing signal to the first control circuit and the second control circuit.

4. The liquid discharge apparatus according to claim 3, wherein in accordance with a selector control signal output by the first control circuit, the selector switches whether to supply the first timing signal to the first control circuit and the second control circuit or to supply the second timing signal to the first control circuit and the second control circuit.

5. The liquid discharge apparatus according to claim 1, wherein the first discharge section includes a piezoelectric element driven by being supplied with the drive signal, and the first control circuit obtains residual vibration that occurs after the piezoelectric element is driven in the second mode.

6. The liquid discharge apparatus according to claim 1, wherein the first discharge section performs a flushing operation in the second mode.

* * * * *